F. C. CARSTARPHEN.
BRAKE.
APPLICATION FILED JUNE 3, 1916.

1,225,009.

Patented May 8, 1917.
3 SHEETS—SHEET 1.

WITNESSES

INVENTOR

F. C. CARSTARPHEN.
BRAKE.
APPLICATION FILED JUNE 3, 1916.
1,225,009.
Patented May 8, 1917.
3 SHEETS—SHEET 3.
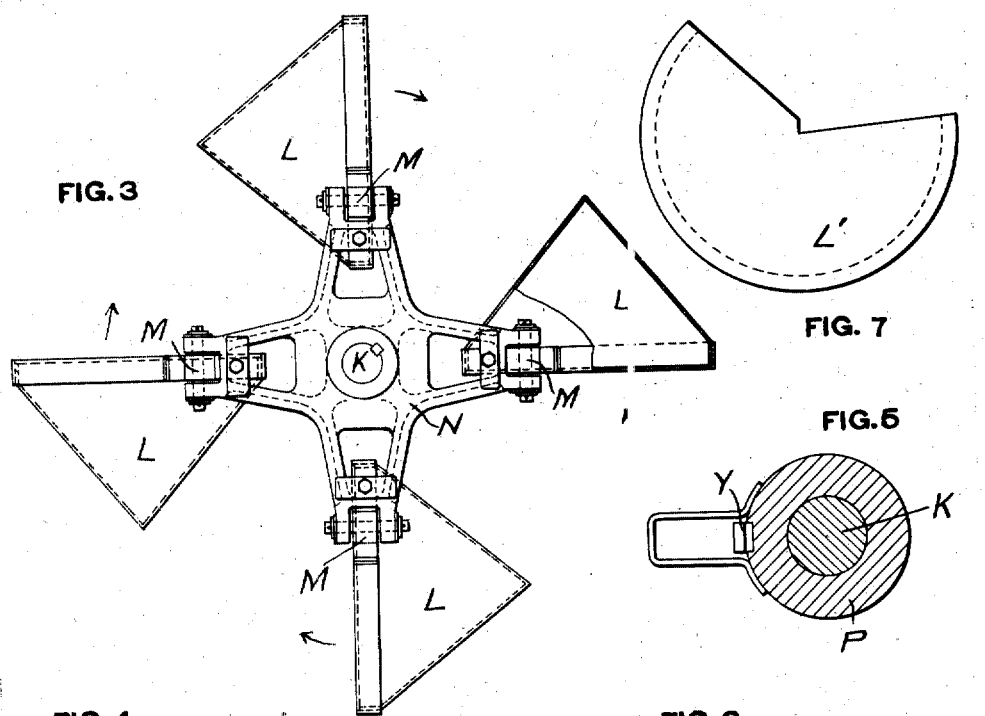
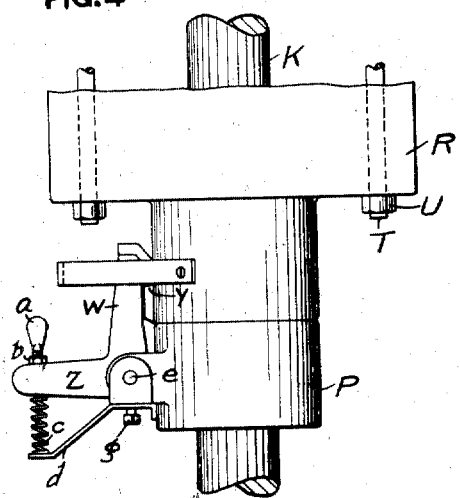
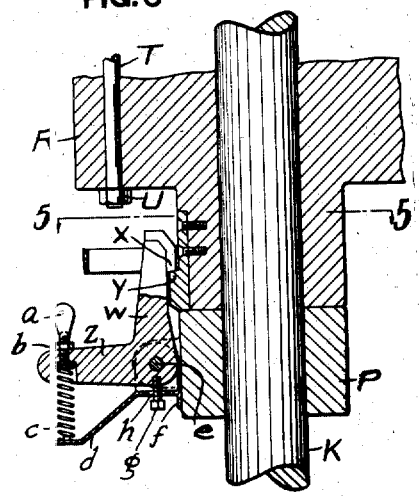
WITNESSES
INVENTOR

UNITED STATES PATENT OFFICE.

FREDERICK C. CARSTARPHEN, OF TRENTON, NEW JERSEY, ASSIGNOR TO THE AMERICAN STEEL AND WIRE COMPANY OF NEW JERSEY, OF HOBOKEN, NEW JERSEY, A CORPORATION OF NEW JERSEY.

BRAKE.

1,225,009.  Specification of Letters Patent.  Patented May 8, 1917.

Application filed June 3, 1916. Serial No. 101,518.

*To all whom it may concern:*

Be it known that I, FREDERICK C. CARSTARPHEN, a citizen of the United States, residing in Trenton, New Jersey, have invented certain new and useful Improvements in Brakes, of which the following is a specification.

This invention aims to provide an improvement in brakes adapted for a variety of uses and especially as a sentinel brake for rope tramways.

The accompanying drawing illustrates one embodiment of the invention.

Fig. 3 is a plan of the same;

Fig. 4 is a side elevation of a latch mechanism;

Fig. 5 is a horizontal section on the line 5—5 of Fig. 6, omitting the latch;

Fig. 6 is a partial side elevation and a partial section of the latch and related parts;

Fig. 7 is a design for a flat blank for one of the vanes.

Referring now to the embodiment of the invention illustrated the tramway rope A passes over a guide pulley B and down to a grooved driving pulley C which is driven through a gear D by a pulley E on a shaft F which in turn is driven by any suitable source of power through a gear G. On the end of the shaft F is a bevel gear H engaging a similar gear J on the lower end of a shaft K which carries the brake.

Figure 1:
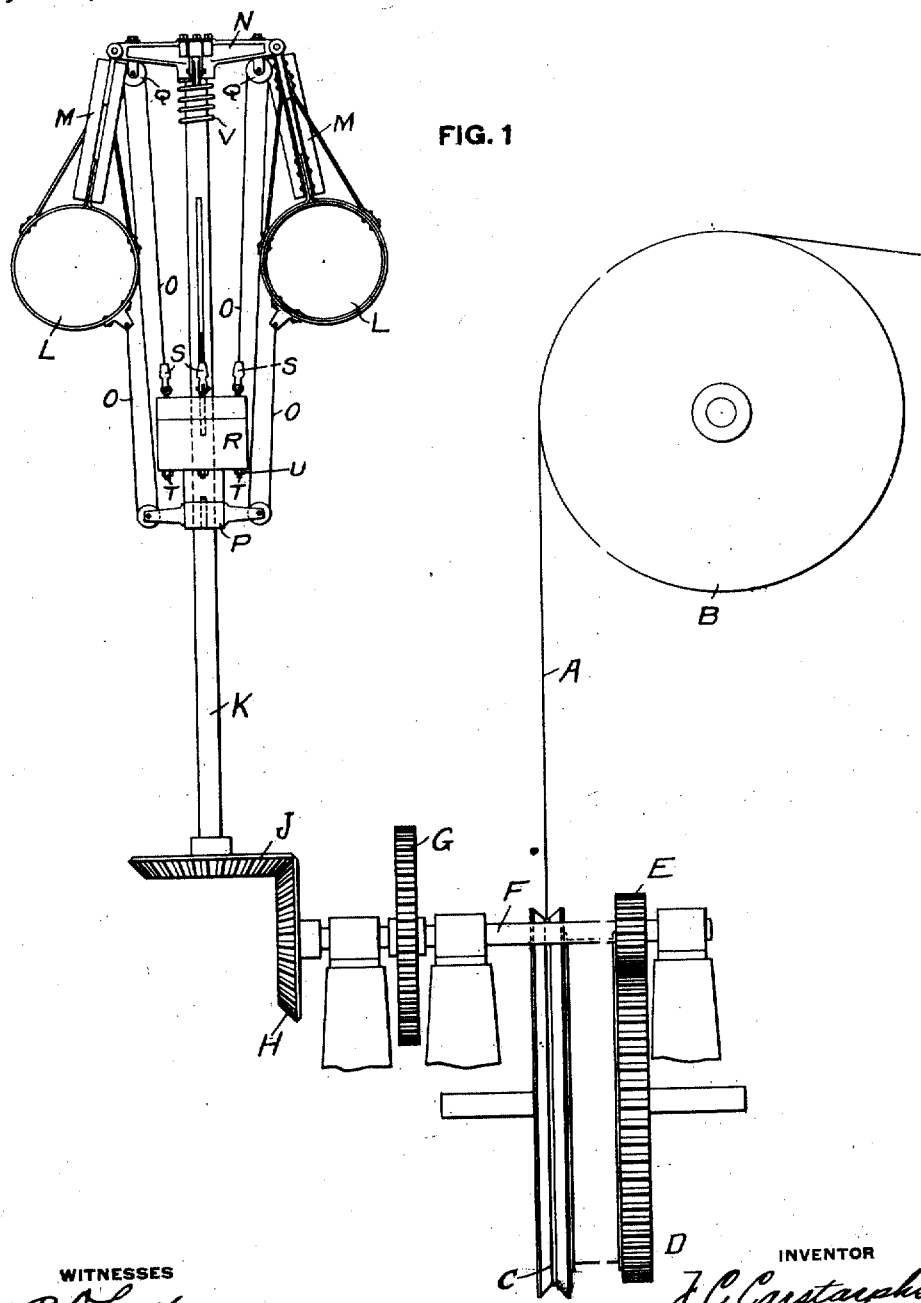
Figure 1 is an elevation showing the brake applied to one of the driving pulleys of a rope tramway.
Figure 2:
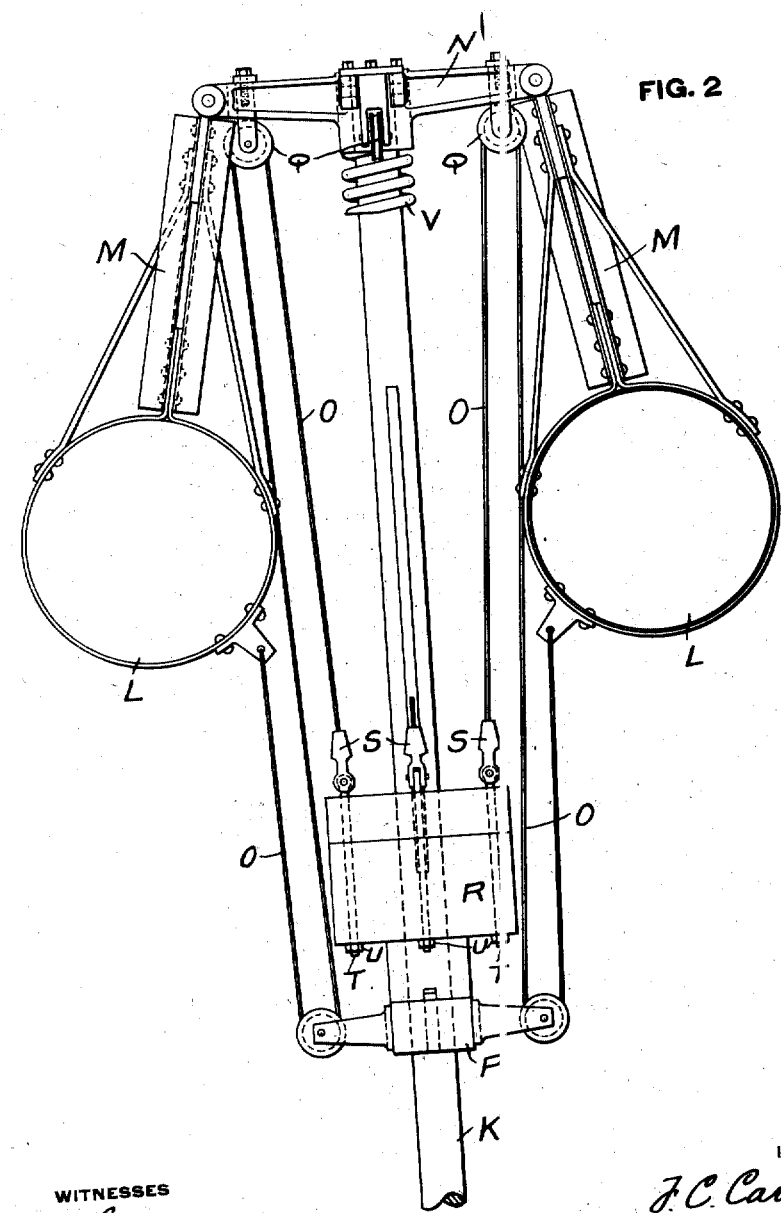
Fig. 2 is a similar view on a larger scale of the brake itself.

The brake illustrated is of the centrifugal type comprising four vanes L mounted on the ends of arms M which are pivoted on their inner ends to a spider N mounted fixedly on the top of the shaft K. The vanes are held down normally each by means of a rope O fastened at one end to the vane, passing thence around a pulley on an arm of a latch-carrying collar P, thence around a pulley Q carried on an arm of the spider N, thence down to a weight R. The connection of the rope to the weight is through a socket S (Fig. 2) which is pivoted on the upper end of a bolt T which passes through the weight R and is fastened by a nut U on its lower end. When the shaft is rotated the centrifugal force tends to throw the vanes outward and to pull on the rope O and lift the weight. When there is no rotation, or no excessive rotation, of the shaft the weight will slide down the shaft and draw the vanes inward. A coil spring V is mounted on the under-side of the spider N and receives the blow of the weight when the latter rises quickly.

The vanes are of an advantageous design. They are made in the shape of conical cups with their open sides forward as they rotate, the arrow in Fig. 3 showing the direction of rotation. I have found by experiments with this style of vane that for the speeds generally used it presents approximately forty per cent. more resistance than a flat disk and almost one hundred per cent. more than the ordinary ball vanes, given the same area normal to the direction of the movement of the vane or disk or ball. Such a conical cup-shaped vane can be easily bent up from a flat blank in the form of a segment of a circle, such a blank being indicated at L', Fig. 7, for example.

When the speed of the rope and consequently that of the brake shaft K is within a determined limit the vanes will be held in their lowest position by the weight which when it falls is automatically latched to the collar P. This collar is formed with ears on one side which carry the pivot of a latch, the upper arm W (Fig. 6) of which is provided with a shoulder X of hardened steel adapted to be caught over a shoulder Y of similar material mounted on the lower part of the weight R. The coacting faces of the shoulders X and Y are beveled so as to incline slightly to the horizontal, when in holding engagement, the beveled faces enabling the lifting movement of the weight R to force the latch arm W outward against the resistance of the spring C engaging the arm Z of the latch in disengaging the weight from the latch. The latch has a horizontal arm Z which carries at its outer end an adjusting abutment screw $a$ which is fastened by a set nut $b$ and the lower end of which bears on a coiled spring $c$ which at its lower end bears on a bracket $d$ which is fastened on the outer end of the pivot pin $e$ of the latch and which has at its inner end a flange $f$ bearing against the collar P. A stud bolt $g$ is set into the latch at a point below its pivot and passes through a slot $h$ in the bracket $d$, and, as it strikes one end or the other of the slot $h$ limits the inward and outward movement of the latch.

When the parts are latched as shown the brake offers a minimum resistance to the operation of the line. However, as soon as the velocity of the tramway and the brake shaft K reach a point where the centrifugal force of the vanes L exerts sufficient lifting force on the weight R, the resistance of the spring $c$ is overcome and the arm W is forced outwardly so that the latch releases the weight. The weight then slides upward on the shaft quickly, until it is checked by the spring V. Generally speaking, the apparatus will be so proportioned that the speed at which the latch is released will be sufficient to throw the vanes to their highest position, that is, with their arms horizontal or approximately so. Thus in the normal position there will be little or no braking action. But as soon as the speed exceeds a determined limit the braking action will immediately become a maximum. As soon as the brake checks the speed of the tramway sufficiently the weight slides down and automatically engages the latch.

Though I have described with great particularity of detail a certain embodiment of my invention, yet it will be understood that various modifications may be made in detail and in the arrangement of the parts without departing from the invention.

What I claim is—

1. A braking mechanism including means for exerting a braking effect at all speeds above a determined maximum and means for holding the aforesaid means in fixed position for all speeds below said maximum.

2. A braking mechanism including vanes adapted to be rotated and to be moved outward as their speed of rotation increases so as to offer an increased resistance and means for holding said vanes in their inward position until the speed of rotation reaches a determined maximum and then releasing them.

3. A braking mechanism including vanes adapted to be rotated and to be moved outward as their speed of rotation is increased so as to offer a greater resistance, means for holding said vanes inward comprising a weight and a latch to hold said weight down, said latch being adapted to yield and permit the upward movement of the weight and the outward movement of the vanes when the speed of rotation exceeds a predetermined maximum.

4. A braking mechanism including pivoted arms having vanes on one end thereof which are cup shaped, and means for rotating said arms, said arms being adapted to swing outward when rotated and means for rotating the arms and cups thereon, the open ends of the cups being forward to thereby increase the resistance to rotation offered thereby.

5. A braking mechanism including means for exerting braking effect at all speeds above a predetermined maximum, and means for holding the aforesaid means in fixed position for all speeds below said maximum, said means including a latch, a spring for maintaining said latch in holding position, and means for adjusting the compression on said opening.

6. A braking mechanism including swinging arms having vanes and adapted to be rotated and to be swung outwardly by centrifugal force, means for holding said arms against swinging movement, said means comprising a weight and a latch engaging with and preventing lifting movement of said weight engaging faces of said latch and weight being beveled, and yielding means for maintaining said latch in holding engagement with the weight, said latch being adapted to yield and permit upward movement of the weight and outward swinging movement of said arms when the speed of rotation exceeds a predetermined maximum.

In witness whereof, I have hereunto signed my name.

FREDERICK C. CARSTARPHEN.